Patented Feb. 4, 1930

1,745,350

UNITED STATES PATENT OFFICE

NIKODEM CARO, ALBERT RUDOLPH FRANK, HANS HEINRICH FRANCK, AND HUGO HEIMANN, OF BERLIN, GERMANY

PREPARATION OF CYANAMIDES OF THE ALKALINE-EARTH METALS AND MAGNESIUM

No Drawing. Application filed October 19, 1927, Serial No. 227,354, and in Germany October 28, 1926.

A number of methods of formation of the alkaline earth cyanamides have been described in the literature (c. f. Beilstein IV Ed., vol. III, p. 78). None of these can however be used for the preparation of the pure salts since foreign atoms which cannot be converted into the gaseous form always participate in the reaction. It is not possible to treat the cyanamides with aqueous liquids and it is hence impossible to remove the foreign materials from the reaction mixture.

The surprising fact has now been discovered that cyanamides can be conveniently prepared by the action of gaseous HCN on the oxides (or salts of the metals named which are converted into oxides when heated) under the conditions given below. From analogy with the formation of alkali cyanides from alkali carbonates and gaseous HCN, one would expect cyanides to be formed also in this case. As a matter of fact, calcium cyanide is initially formed when HCN is passed over calcium oxide, for example at 350°. At temperatures over 420°, the reaction product contains cyanamide as well as cyanide and the proportion of cyanamide increases with increasing temperature in such a way that at temperatures over 550 to 600°, cyanamide is found exclusively as the product.

It may be assumed that during the conversion of cyanide to cyanamide according to the equation:

$$Ca(CN)_2 = CaCN_2 + C,$$

free carbon should be formed which would introduce an undesirable impurity into the product. This assumption is suggested particularly by the fact that in the nitrification of carbide to lime nitrogen, the passage through the cyanide stage and the decomposition of cyanide to cyanamide connected with it is considered probable and the corresponding amount of elementary carbon is found in the nitrified product. In the present case, analysis of the reaction gases has shown that liberated carbon is not given off in the elementary form, but, as carbon monoxide together with an equivalent quantity of hydrogen. The substances obtained are pure white. The reaction must be expressed by the following equation:

$$CaO + 2HCN = CaCN_2 + CO + H_2$$

This process may be regarded therefore, as representing the inverse of the process protected in D. R. P. 417,018 for the preparation of HCN from metallic cyanamides.

It was also found that this reaction can also be applied to the other alkaline earth metals; thus magnesium cyanamide which is characterized by its high nitrogen content of 43.6% and for which no other method of preparation is known can be obtained in this way. Instead of oxides, salts, e. g., carbonates which yield oxides may be used.

Sometimes, it is of advantage to dilute the hydrocyanid acid with indifferent gases or with ammonia.

*Examples*

1. Calcium carbonate which has been heated in a current of indifferent gas is heated in an electric tube oven for 2 hours at 750° to 850° in a current of HCN and then allowed to cool in an indifferent gas current. The product obtained is snow-white and contains over 99% calcium cyanamide.

2. Dry magnesium oxide is heated for 3 hours at 650° to 750° in a current of HCN. The product contains 36% nitrogen—82.5% $MgCN_2$, which can be further enriched by grinding and retreating.

During further development of the process, it was found that these metallic cyanamides could be obtained with equally good yields when the oxides or oxide yielding compounds such as hydroxides, or carbonates are treated at high temperatures with mixtures capable of forming hydrocyanic acid. Such mixtures for example are ammonia and carbon monoxide which, according to known processes react in presence of contact substances (e. g. platinum, cerium oxide, aluminum oxide) to form HCN according to the equation:

$$NH_3 + CO = HCN + H_2O$$

That such mixtures could be used without previous conversion, instead of the previously formed HCN could by no means be foreseen.

The yields hitherto obtained in the synthesis of HCN from ammonia and carbon monoxide are so unfavorable, taking place only on great dilution and even then with appreciable loss of fixed nitrogen by decomposition of the ammonia, that the use of this synthesis for the purpose mentioned in the patent would not seem very hopeful.

According to experiments, however, when ammonia-carbon monoxide mixtures are passed over oxides, hydroxides or carbonates of the alkaline earth metals or magnesium under ordinary or increased pressure at temperatures above 400° and preferably at 650 to 850°, a 100% yield of nitrogen, fixed in the solid state as high grade cyanamide of the metal or recovered as ammonia, is obtained. Thus, from calcium oxide, such as burnt lime, or calcium hydroxide or any other compound which is converted into calcium oxide on heating, high grade calcium cyanamide is obtained.

As can be seen from the above equation for the synthesis of HCN and from the equation representing the principal reaction, water is initially formed during the reaction. It would be expected, therefore, according to the theory of equilibrium that the presence or addition of water either in the gas current or in the solid materials, e. g. use of wet lime, calcium hydrate or carbonate, would have an unfavorable effect. The surprising observation has been made, however, that the addition of water or the use of moist materials accelerates the rate of cyanamide formation appreciably.

A certain difficulty was at first presented by the fact that HCN as well as the gas mixture undergoes decomposition in contact with certain metals, e. g. iron, especially. Such decomposition is largely prevented by avoiding the presence of iron as much as possible, by using ceramic material and metals such as zinc which do not promote decomposition, for the apparatus used, and by removing all iron compounds (carbonyl compounds) from the gases. A particularly effective method however is to maintain a certain concentration of sulfur in the reaction gas, e. g. by addition of sulfuretted hydrogen or carbon disulfide initially or during the course of the reaction. Additions of sulfides or sulfur-containing compounds such as calcium sulfide or calcium sulfate to the solid phase have the same effect.

The metallic cyanamides obtained by the above described process are pure white, free from foreign substances, particularly carbon and of very high grade. They can be used for chemical reactions or used directly.

What we claim is:

1. A process for the preparation of metallic cyanamides which comprises treating an oxide of a metal of the second group of the periodic system with hydrocyanic acid gas at elevated temperatures.

2. A process for the preparation of metallic cyanamides which comprises treating an oxide of a metal of the second group of the periodic system with hydrocyanic acid gas at temperatures exceeding 400° C.

3. A process for the preparation of metallic cyanamides which comprises treating an oxide of a metal of the second group of the periodic system with hydrocyanic acid gas at temperatures between 650° and 850° C.

4. The process of claim 2 in which the reaction is carried out at pressures above atmospheric.

5. The process of claim 1 in which the reaction is carried out in the absence of substances which promote the decomposition of the reaction gases.

6. The process of claim 2 in which the reaction is carried out in the absence of substances which promote the decomposition of the reaction gases.

7. A process for the preparation of metallic cyanamides which comprises treating an oxide of a metal of the second group of the periodic system with hydrocyanic acid gas in the presence of moisture and at a temperature exceeding 400° C.

8. A process for the preparation of metallic cyanamides which comprises treating an oxide of a metal of the second group of the periodic system with hydrocyanic acid gas containing a small amount of substances which counteract hydrocyanic acid decomposing catalysts at temperatures exceeding 400° C.

9. A process for the preparation of metallic cyanamides which comprises treating a compound of a metal of the second group of the periodic system which yields the oxide upon heating, with hydrocyanic acid gas at temperatures exceeding 400° C.

10. A process for the preparation of alkali earth metal cyanamides which comprises treating an alkaline earth metal oxide with hydrocyanic acid gas as temperatures above 400° C.

11. A process for the preparation of calcium cyanamide which comprises treating calcium oxide with hydrocyanic acid gas at temperatures exceeding 400° C.

In testimony whereof we affix our signatures.

NIKODEM CARO.
ALBERT RUDOLPH FRANK.
HANS HEINRICH FRANCK.
HUGO HEIMANN.